No. 743,787. PATENTED NOV. 10, 1903.
G. G. WICKSON.
LEVER OPERATED VALVE.
APPLICATION FILED NOV. 29, 1902.
NO MODEL.
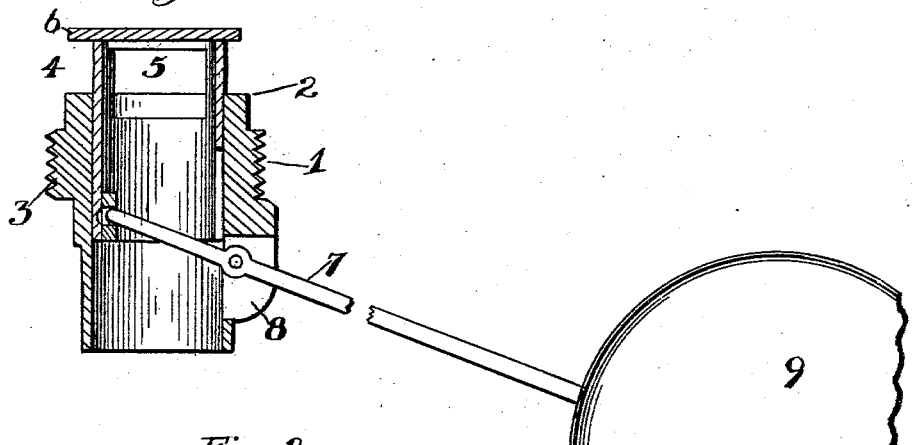
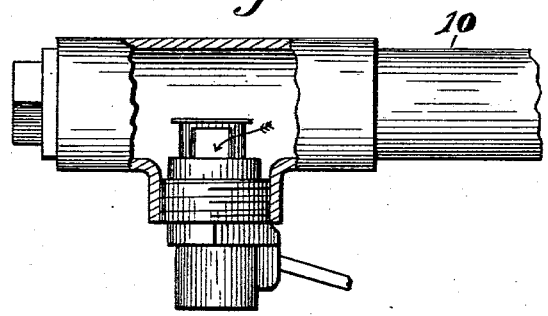
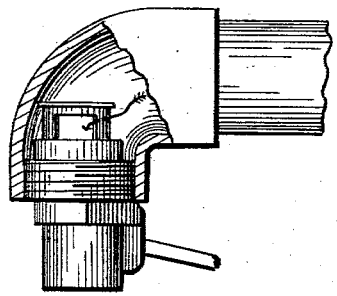
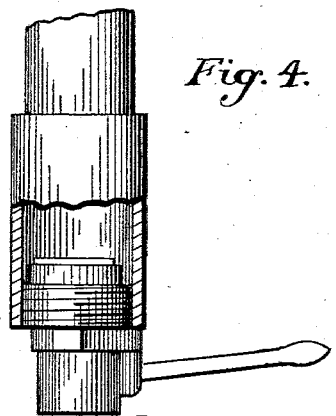

No. 743,787. Patented November 10, 1903.

UNITED STATES PATENT OFFICE.

GEORGE G. WICKSON, OF SAN FRANCISCO, CALIFORNIA.

LEVER-OPERATED VALVE.

SPECIFICATION forming part of Letters Patent No. 743,787, dated November 10, 1903.

Application filed November 29, 1902. Serial No. 133,241. (No model.)

*To all whom it may concern:*

Be it known that I, GEORGE G. WICKSON, a citizen of the United States, residing at San Francisco, in the county of San Francisco and State of California, have invented certain new and useful Improvements in Lever-Operated Valves, of which the following is a specification, reference being had therein to the accompanying drawings.

My invention has relation to lever-operated valves; and it consists in the novel construction and arrangement of its parts, as hereinafter described.

This invention may be used to advantage for controlling the flow of liquids in a number of instances; but the particular object of my invention is to provide a valve adapted to control the flow of milk from an elevated source of supply to a lower tank, whereby the volume, and consequently the pressure, of the milk in the lower tank is maintained at uniformity. This is of especial advantage for supplying milk to centrifugal cream-separators. The valve proper is of such construction that it may be operated promptly in either opening or closing, and when in an opened position offers a minimum amount of resistance to the liquid passing through the connection between the tanks.

In the accompanying drawings, Figure 1 is a longitudinal sectional view of the valve, showing a float means of operation. Fig. 2 is a side elevation of the valve located in a T connection. Fig. 3 is a side elevation of the valve located in an L connection, and Fig. 4 is a side elevation of the valve in closed position located in a coupling.

The valve consists of a casing 1, which is provided at its upper end with an annular seat 2, the form of the valve as shown in the drawings being provided on its exterior with a thread 3, adapted to engage a corresponding thread in the interior of the fittings, which also act as housings for the valve proper. The hollow valve-stem 4 fits within the inner walls of the casing 1, which serve as a guide for the said stem. The said stem is hollow and is provided at its upper end with lateral openings 5. The valve-plate 6 is located on top of the stem, the said plate being of greater diameter than that of the stem. Consequently the edge of the valve-plate projects beyond the side of the stem. The lever 7 is fulcrumed to the casing 1, and the inner end of said lever passes through an opening 8 in the side of the said casing, the extreme inner end of the said lever 7 engaging the lower portion of the valve-stem 4 in any suitable manner.

As shown in the drawings, I provide a float 9 for manipulating automatically the lever 7 and the valve-stem 4 and its attachments; but any other suitable operating means may be substituted should occasion require.

In operation the valve 6 moves against the flow of the liquid. The liquid passes through the pipe 10 in a direction as indicated by the arrows in Figs. 2 and 3. Presuming that the valve is in the position as shown in Figs. 1, 2, and 3, the liquid passes through the openings 5, down through the hollow stem 4, and out through the lower end of the valve-casing 1. As the outer end of the lever 7 is elevated the opening 5 gradually descends within the upper end of the casing 1, and the flow of the liquid is gradually checked until the valve assumes the position as shown in Fig. 4, when the flow of the liquid is completely cut off. In opening the valve the operation above described is reversed. Consequently in using the valve in the special application above referred to as the float 9 rises and lowers upon the surface of the liquid previously passed through the valve the valve is operated (either opened or closed) and the level of the liquid in the lower tank (not shown in drawings) is maintained at uniform depth, and consequently there is a uniformity of pressure in the lower tank. This form of valve is such that it may be easily and quickly attached to any common form of pipe-fittings—notably T's, L's, and couplings—and the said fittings serve as a housing for the valve proper in any of the forms. This construction also provides a valve which is very convenient for ready cleansing and important especially in the handling of milk. As notable when connected with a T-fitting, the plug at the outer end can be readily removed, also the valve and stem, and thus the entire valve, as also outlet from the upper tank, can be easily reached by a brush for cleaning. The parts are of such construction that they can be easily and readily interchanged or renewed without special fittings.

Having described my invention, what I claim as new, and desire to secure by Letters Patent, is—

A valve consisting of a casing, its upper end forming a horizontal seat, said casing having an opening of uniform diameter extending throughout, a hollow cylindrical stem fitting closely along its entire length within said casing, said stem having its lower end open and its upper end closed, and being provided in its upper portion with lateral openings, a valve located at the upper end of the stem having an edge projecting horizontally beyond the sides of the stem and adapted to engage the horizontal seat at the upper end of the casing, the lower end of said stem being provided on one side with a slot, said slot having unbroken, perpendicular side walls, and opening at its lower end in the lower edge of the stem, lugs located within said stem diametrically opposite said slot, a lever fulcrumed to the casing and passing through the same, the inner end of said lever being located between the said lugs, said slot adapted to receive the lever as the stem descends and thereby prevent said stem from rotating, said slot adapted to pass above the said lever when the stem is elevated and thereby permitting said stem to rotate, and a means for operating said lever.

In testimony whereof I affix my signature in the presence of two witnesses.

GEORGE G. WICKSON.

Witnesses:
MELVILLE D. HENSEY,
A. E. GLASCOCK.